Dec. 14, 1948.  P. M. WADDILL  2,456,348
PREVENTION OF SILICEOUS DEPOSITS IN
HYDROCARBON CONVERSION PROCESSES
Filed July 12, 1945
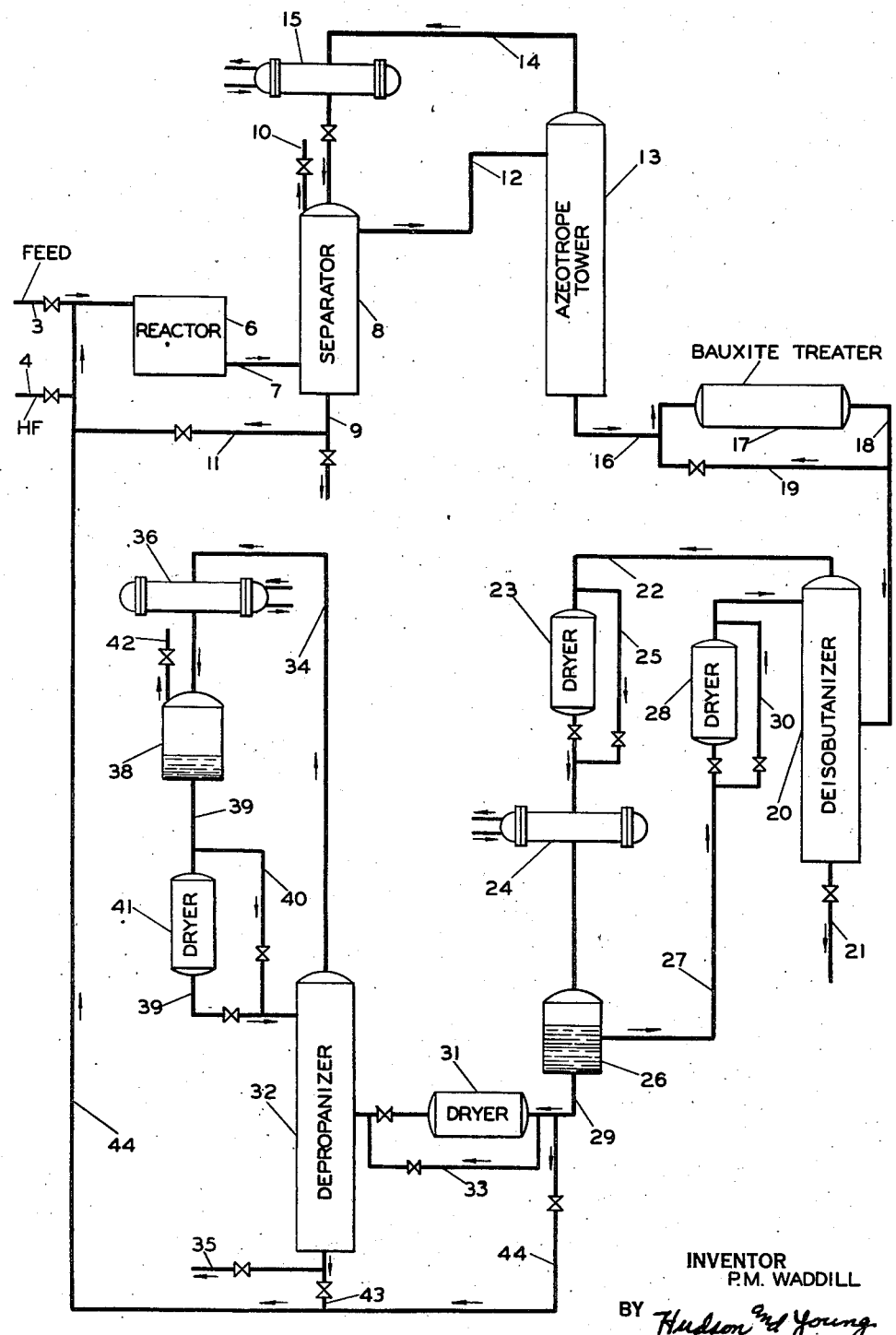
INVENTOR
P.M. WADDILL
BY Hudson and Young
ATTORNEYS Patented Dec. 14, 1948

2,456,348

UNITED STATES PATENT OFFICE 2,456,348

PREVENTION OF SILICEOUS DEPOSITS IN HYDROCARBON CONVERSION PROCESSES

Paul M. Waddill, Bartlesville, Okla., assignor to Phillips Petroleum Company, a corporation of Delaware Application July 12, 1945, Serial No. 604,598

3 Claims. (Cl. 260—683.4)

This invention relates to the treatment of hydrocarbon materials. In one particular embodiment this invention relates to the prevention of siliceous deposits which may accumulate in condensers used in the fractionation of hydrocarbons. In a particular aspect this invention relates to the prevention of siliceous deposits formed in connection with the conversion of hydrocarbons in the presence of fluorine-containing catalysts.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons to produce motor-fuel hydrocarbons in the presence of catalysts comprising one or more of such fluorine compounds as hydrofluoric acid, boron trifluoride, or the like. Although the exact nature or composition of the organic fluorine-containing by-products which may be formed has not been definitely established, they are believed to be predominantly alkyl and/or aryl fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

As discussed in Frey Patent 2,347,945, issued May 2, 1944, such organic fluorine compounds may be removed from hydrocarbon materials containing them by contacting such a hydrocarbon material with any one of a number of solid porous contact materials. Contact materials which have been found suitable include those known to be catalytically active for hydrogenation and dehydrogenation reactions such as alumina gel, activated alumina, dehydrated bauxite, chromium oxide, mixtures of alumina and chromium oxide, chromium ores comprising chromium oxide and ores of related materials such as those containing zirconia, limestone, magnesia, and the like. Such contact materials appear to adsorb preferentially the organic fluorine compounds although the exact mechanism involved is not known at present. Materials which contain large quantities of silicon dioxide or of various naturally occurring silicates are generally not suitable for such treatment, but many of the naturally occurring ores which can be so used contain appreciable amounts of silica or silicates. One such material which has found wide commercial use is hard granular bauxite. Such bauxite has a variable composition, which may be exemplified by the following typical analysis, in per cent by weight:

| Substance | Percent |
|---|---|
| $Al_2O_3$ | 77.5 |
| $SiO_2$ | 9.4 |
| $TiO_2$ | 3.4 |
| $Fe_2O_3$ | 6.0 |
| $H_2O$ | 1.7 |
| V. M | 2.0 |
| Total | 100.0 |

The presence of silica is undesirable because it causes the formation of silicon tetrafluoride. Nevertheless, in practice bauxite containing up to 15 and even 20 per cent of silica has been used, in the absence of any alternative readily available and economical material. When the bauxite has become partially spent for such use and/or when the hydrocarbon material being treated is passed through the mass of contact agent at a high flow rate, it has been found that silicon tetrafluoride is present in the effluent; also, some water, which appears to be formed by reaction of the fluorine compounds with the bauxite, is present in the effluents. That is, after conversion of the hydrocarbons, either in the liquid or vapor phase, in the presence of fluorine-containing catalysts, such as hydrogen fluoride, boron trifluoride, or the like, silicon tetrafluoride is formed when the hydrocarbon conversion effluent is contacted with contact materials containing minor proportions of silica.

It is necessary, in most cases, to remove the organic fluorine compounds by contacting the hydrocarbon effluent with a suitable contact material; but as a result of this treatment silicon tetrafluoride and water are liberated by the reaction of hydrogen fluoride or the organic fluorine compounds with silica present as an impurity in the contact material. Typical equations of reactions which may occur in the treatment of the effluent with bauxite are:

$$RCH_2CH_2F \xrightarrow{Al_2O_3} RCH=CH_2 + HF$$

$$6RCH_2CH_2F + Al_2O_3 \longrightarrow 6RCH=CH_2 + 2AlF_3 + 3H_2O$$

$$4RCH_2CH_2F + SiO_2 \longrightarrow 4RCH=CH_2 + SiF_4 + 2H_2O$$

$$SiO_2 + 4HF \longrightarrow 2H_2O + SiF_4$$

$$Al_2O_3 + 6HF \longrightarrow 3H_2O + 2AlF_3$$

Although bauxite has been referred to in particular, any type of contact material suitable for the absorption of organic fluorine compounds in which minor proportions of silica are present is within the scope of this invention.

After being formed, the water and the silicon tetrafluoride are conveyed along with the hydrocarbon effluent from the contact material to subsequent treating equipment, which is usually fractionating equipment. The water and silicon tetrafluoride accumulate in the overhead fractions from the various fractionators, since they comprise some of the low-boiling components of the hydrocarbon effluent. In consequence, trouble is experienced with the subsequent treating equipment as a result of the silicon tetrafluoride reacting with water to form various solid siliceous deposits. When the effluent of the bauxite treating step just discussed is in the liquid phase, and the proportions of silicon tetrafluoride and water are so small that these materials are completely dissolved, relatively little or only minor trouble may be experienced, if any. However, when much of the heavier hydrocarbon materials have been removed by fractional distillation so that the concentrations of the silicon tetrafluoride and the water are increased, such as to the point at which the condensed hydrocarbon effluent is about 35 per cent saturated with water, and especially when the temperature is so low that free liquid water separates from the hydrocarbon mixture, the silicon tetrafluoride reacts with the water, forming siliceous solids that accumulate, thereby partially or completely plugging equipment and necessitating an expensive shutdown and interruption of production in order to remove the siliceous deposits. Sometimes the deposits form in the condenser of the first fractionator, such as the deisobutanizer; sometimes the deposits may not form until the effluent has reached the condenser of the second fractionator, such as a depropanizer; sometimes the deposits form in the condensers of all the fractionators.

The following equations are illustrative of reactions involved in the hydrolysis of silicon tetrafluoride:

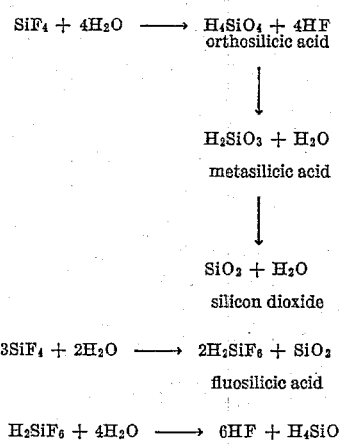

The formation of orthosilicic acid results in a gel-type deposit which tends to accumulate and plug the condenser tubing and reflux pipes and valves. Under appropriate conditions orthosilicic acid decomposes to metasilicic acid or silicon dioxide, which are precipitated and which also obstruct the passage of hydrocarbons through the condensers and tubings of the fractionating equipment.

The deposits appear to vary with the proportions of water and silicon tetrafluoride in the hydrocarbon stream; and these proportions in turn vary with such factors as the degree of spending of the bauxite. The deposition is favored markedly by increase in the water content of the hydrocarbon stream, and it has been found that only minor hydrolysis of silicon tetrafluoride occurs when the hydrocarbon stream is less than 35 per cent saturated with water.

The amount of organic fluorine present in the charge to the treating step for the removal of fluorine compounds generally is not more than about 0.1 per cent by weight and often is not more than 0.001 to 0.05 per cent by weight. Most of this organic fluorine is retained by the treating agent, and the silicon tetrafluoride in the effluent from this treating step generally is less than about 0.01 per cent by weight, and often is less than 0.0005 per cent by weight. Nevertheless, in commercial plants, wherein several hundred barrels of hydrocarbons are treated per day and the silicon tetrafluoride reacts with water to form solid siliceous deposits in one specific location, such as the condenser and accumulator of a deisobutanizer or a depropanizer, the amount of solid siliceous material accumulated over a period of a few weeks or a few months is very substantial.

This invention constitutes an alternative method for preventing the formation of siliceous deposits from that method described in the copending application of Ralph C. Cole, Serial No. 574,760, filed January 26, 1945, now U. S. Patent 2,430,453, issued November 11, 1947, in which siliceous deposits are removed or prevented by washing the hydrocarbon streams with a suitable wash solution.

An object of the present invention is to provide a process for preventing the formation of siliceous deposits in condensers of fractionating equipment used for the separation of the product of a hydrocarbon conversion process.

It is also an object to prevent the plugging of condensers and tubing wherein siliceous deposits are accumulated as the result of the presence of silicon tetrafluoride and water in the condensate.

Another object is to prevent the corrosion of fractionating equipment caused by the liberation of acids in the condensers and tubing of the fractionating equipment.

A still further object is to decrease the water content of a hydrocarbon effluent in an alkylation process using a fluorine-containing alkylation catalyst.

Other objects and advantages will appear obvious to those skilled in the art from the accompanying disclosure and description.

According to this invention, the formation of siliceous deposits in condensers, accumulators, reflux pipes, etc., of fractionating equipment used in hydrocarbon conversion processes using fluorine-containing catalyst is prevented or minimized by controlling the water content of hydrocarbon streams containing silicon tetrafluoride. When the water content of a liquid hydrocarbon stream containing silicon tetrafluoride is less than the amount of water which is soluble in the liquid hydrocarbon stream, a separate water phase will not occur, and, as previously stated, the absence of a separate water phase prevents the hydrolysis of the silicon tetrafluoride to any appreciable extent. In the case of an alkylation process using a fluorine-containing catalyst, the necessary control of the water content may be achieved by the use of conventional driers disposed at convenient locations between the treaters which remove organic fluorine compounds and the place where the siliceous deposits have been found to occur. These driers contain suitable drying agents for removing water from the hydrocarbon stream and the drying operation may be carried out when the hydrocarbon stream is in either the liquid or vapor phase. Preferably, the hydrocarbon stream contacts the drying agent in the liquid phase since, as a general rule when operating in the liquid phase, the temperature of the hydrocarbon stream will be lower than when operating in the vapor phase. A lower temperature of drying enables a higher efficiency of water removal by the drying agent. In general, it is preferred to maintain the temperature of the hydrocarbon stream contacting the drying agent below about 150° F. to obtain optimum absorption of water.

Drying agents which are suitable for removing water from a hydrocarbon stream comprise bauxite, silica gel, calcium oxide, solid sodium hydroxide, etc., and preferably the drying agent is of the regenerative type, such as dehydrated bauxite. When bauxite is used as the drying agent, the bauxite may be regenerated to substantially its original sorption power after sufficient water has been assimilated to decrease its sorption power below an economically desirable amount by heating to a temperature between about 300 to 600° F. It is within the scope of this invention to remove water from the hydrocarbon stream by other suitable methods which do not result in the formation of a separate water phase, and the manner in which the water is removed is not considered limiting to the scope of the invention.

In locating the driers, it is preferable to place them on the deisobutanizer reflux and/or on the depropanizer reflux or feed when this invention is carried out in connection with a process for alkylating low-boiling hydrocarbons. It may also be desirable to place the dryer on the overhead stream from the deisobutanizer in lieu of the previously mentioned locations; however, in some cases driers may be placed in all the mentioned locations in order to assure adequate control of the water content of the various hydrocarbon streams.

The drawing represents diagrammatically one arrangement of apparatus in which one embodiment of the present invention may be practiced. This embodiment includes a liquid-phase alkylation of hydrocarbons in which hydrogen fluoride is used as the catalyst. The hydrocarbon feed, comprising a mixture of low-boiling isoparaffins and olefins, enters reactor 6 through line 3. Any desired type of reaction chamber or series of chambers may be employed without departing from this invention. Hydrogen fluoride catalyst is introduced through lines 4 and 44 to reactor 6. Alkylation of the hydrocarbons is accomplished under known conditions of pressure, temperature, and residence time in reactor 6. The effluent therefrom passes through line 7 into separator 8, in which it separates into two liquid phases, a hydrocarbon phase and a heavier hydrogen fluoride phase. The liquid hydrogen fluoride phase is withdrawn from separator 8 through line 9 for purification (not shown) as desired, or may be recycled as a catalyst through line 11 to line 44 for reintroduction into reactor 6. The liquid hydrocarbon phase, containing some dissolved hydrogen fluoride, passes from separator 8 to azeotrope tower 13 by line 12. Separation of a more or less azeotropic mixture of hydrocarbons and hydrogen fluoride is effected in fractionation tower 13. This azeotropic mixture passes as a vapor from tower 13 through line 14 and condenser 15 to separator 8. A liquid hydrocarbon stream, substantially free from hydrogen fluoride but containing organic fluorine compounds formed during the alkylation reaction, passes from the bottom of tower 13 through line 16 to treater 17. These organic fluorine compounds, which are formed as by-products of the hydrocarbon conversion, are removed by treatment with a suitable contact material, such as bauxite or alumina, in treater 17. When siliceous material, such as silica or various natural silicates, is present in the contact material, silicon tetrafluoride and water are formed and will appear in the effluent when the contact material is partially spent and/or when an economically desirable high flow rate is used. Water formed during defluorination is generally present in the resulting effluent in an amount less than that required to saturate the liquid effluent, i. e., less than about one per cent by weight, and silicon tetrafluoride is usually present in an amount less than about 0.01 per cent by weight.

The effluent, now substantially free from organic fluorine compounds but containing silicon tetrafluoride and water as impurities, passes to deisobutanizer 20 by line 18. In most cases this stream is completely in the liquid phase and contains such relatively small proportions of silicon tetrafluoride and of water that these impurities are completely dissolved in the liquid phase. A portion of this stream may be recycled to the bauxite treater 17 through line 19 if desired, although this is not essential. Normal butane and heavier hydrocarbons are separated from isobutane and lighter hydrocarbon in deisobutanizer 20, which is a fractionating column complete with condenser 24 and accumulator 26 and are withdrawn from deisobutanizer 20 by line 21. If desired, the butane and heavier hydrocarbons are conveyed to subsequent fractionators and process equipment (not shown) for separation of the butane and alkylation products; also, a portion of the butane and heavier hydrocarbons from deisobutanizer 20 may be recycled to reactor 6 by means not shown. The overhead product from deisobutanizer 20, comprising isobutane and lighter hydrocarbons, passes therefrom through line 22, condenser 24, into accumulator 26. Vaporous hydrocarbons are condensed in condenser 24 and accumulate as a liquid in accumulator 26. A portion of the liquid hydrocarbons from accumulator 26 is returned through line 27 to deisobutanizer 20 as reflux therefor.

If conditions of temperature and pressure within accumulator 26 and condenser 24 are appropriate, particularly if the solubility of the water in the hydrocarbon is decreased sufficiently to form a separate liquid water phase, siliceous deposits are formed and accumulate in condenser 24 and accumulator 26, and sometimes in line 27 and subsequent fractionating equipment through which the hydrocarbon stream is passed. In order to prevent the formation of such siliceous deposits according to this invention, a dryer 23 is inserted in line 22, preferably before condenser 24, as shown, although the particular location of dryer 23 is not considered controlling to the operation of the invention as long as sufficient water is removed from the hydrocarbon stream thereby. In some cases it may be more desirable to place a dryer on reflux line 27 in addition or in place of dryer 23 on line 22, and in such a case the reflux from accumulator 26 passes through line 27 and dryer 28 to deisobutanizer 20. The hydrocarbon stream may by-pass dryer 23 through line 25 and dryer 28 through line 30, when it is desirable to operate with only one dryer. If it is not necessary to dry the hydrocarbon stream at all at these locations, the stream may by-pass both driers as shown and the hydrocarbon stream is dried subsequently as hereinafter described.

At least a portion, and ordinarily all, of the overhead product from deisobutanizer 20 passes from accumulator 26 into depropanizer 32 by line 29 for separation of isobutane from propane and lighter hydrocarbons. Isobutane, which is incidentally dried as a result of the depropanization, is removed from the bottom of depropanizer 32 and may be withdrawn through line 35 or recycled by lines 43 and 44 to reactor 6, as circumstances may require. The overhead fraction comprising propane and lighter hydrocarbons from depropanizer 32 passes to condenser 36 through line 34, and from condenser 36 the condensed hydrocarbons and vapors pass to accumulator 38. Some of the liquid condensate is returned to depropanizer 32 through line 39 as reflux. Propane and other light hydrocarbons are withdrawn from accumulator 38 through line 42. If desired, part or even all of the overhead product from deisobutanizer 20 may be recycled to reaction 6, as by passing from accumulator 26 through line 44, particularly when the proportion of propane and lighter hydrocarbons is relatively small; in such case, a dryer (not shown) may be provided to remove water from this recycled part.

Frequently in the operation of alkylation processes the accumulation of siliceous deposits in the condenser and tubing of the depropanizing equipment becomes so serious as to curtail the capacity thereof. In turn, because of the resultant insufficient removal of propane and lighter gases, continuation of the operation necessitates resorting to increased venting of such gases, as through line 10 from separator 8, in order to maintain a pressure within the operating limits. This extra venting adversely affects the operation by increased hydrogen fluoride consumption and the loss of valuable iso- and normal butanes. Usually the most serious accumulation and formation of siliceous deposits is observed in the depropanizing equipment, wherein the conditions of temperature and pressure and water concentration are more often such as to form a separate water phase in the condenser, accumulator, and even on some of the fractionating plates of depropanizing column 32. Therefore, according to a specific embodiment of this invention, a dryer 31 is inserted in line 29 as shown. In most cases dryer 31 will remove enough of the water from the hydrocarbon stream to prevent formation of siliceous deposits in any of the accessory equipment of depropanizer 32; however, in some cases it may be desirable to insert an additional dryer in the reflux line to depropanizer 32. When it is desired, therefore, the reflux from accumulator 38 passes through line 39 and dryer 41 to depropanizer 32. Where either dryer 31 or dryer 41 are found sufficient in themselves to remove the necessary amount of water, the hydrocarbon stream may be by-passed through lines 33 and 40, respectively.

In normal practice some of the silicon tetrafluoride is recycled to the fractionator with the reflux and, if water is present in the reflux or on the plates of the fractionating tower, siliceous deposits form in the tower itself. Often this is evidenced by siliceous deposits on the top fractionating plate and by deposits in decreasing amounts on succeeding plates down the tower. By a substantially complete removal of water from the hydrocarbon stream the hydrolysis of silicon tetrafluoride is prevented, and thus the elimination or at least minimization of siliceous deposits in the tower itself is accomplished. Complete removal of water also prevents the carry-over and the formation of further deposits in subsequent equipment.

In case deposits are noticed in both deisobutanizing and depropanizing equipment, the hydrocarbon stream may be passed through driers in all the locations shown in the drawing.

The silicon tetrafluoride in the hydrocarbon stream passes through the driers and fractionating equipment and is removed with the propane from accumulator 38 through line 42.

The present invention may be applied in many processes in which silicon tetrafluoride is present and in which it hydrolyzes, owing to the presence of water, to form siliceous deposits. Although the invention has been applied specifically to hydrocarbon conversion processes, the present invention is not limited or restricted to such processes in its broadest aspects; it is also not restricted in all instances to the source of the water and silicon tetrafluoride or to the location of the siliceous deposits.

Having described a preferred form of the invention and having pointed out the principal considerations to be observed in its operation, and in operation of equivalent systems, it is obvious that various other changes can be made without departing from the scope of the invention.

I claim:

1. In a process involving the alkylation of isobutane with an olefin in the presence of a hydrofluoric acid alkylation catalyst in which a liquid hydrocarbon conversion effluent is contacted with bauxite containing a minor proportion of silica to remove organic fluoride compounds formed during said conversion and thereby is contaminated with water which is present in an amount less than about 1 per cent by weight and with silicon tetrafluoride which is present in an amount less than 0.1 per cent by weight, and in which normal butane and heavier hydrocarbons are separated from isobutane and lighter hydrocarbons of a resulting hydrocarbon effluent in a first fractional distillation and the isobutane is separated from propane and lighter hydrocarbon in a second fractional distillation under conditions such that said silicon tetrafluoride is hydrolyzed to form siliceous deposits during condensation of at least one of the resulting overhead fractions from said distillations, the method for preventing the formation of such siliceous deposits which comprises decreasing the water content of at least a portion of said overhead fractions from which such deposits separate below the amount of water which is soluble in said condensed fractions by contacting said overhead fractions showing deposition with a drying agent.

2. In a process involving the conversion of hydrocarbons in the presenve of a fluorine-containing catalyst in which a liquid hydrocarbon conversion effluent is contacted with a contact material active in removing organically combined fluorine and containing minor proportions of silica and thereby is contaminated with silicon tetrafluoride and with water in a concentration such that it is soluble in said conversion effluent, and in which components of a resulting hydrocarbon effluent are separated by fractional distillations under conditions such that water is concentrated in at least one of the overhead effluents of the distillations and said silicon tetrafluoride is hydrolyzed to form siliceous deposits upon the condensation of the overhead effluent, the method for preventing the formation of such siliceous deposits which comprises decreasing the water content of said overhead effluent below the amount of water which is soluble therein by contacting at least a portion of the reflux stream to the distillation with a drying agent.

3. In a process for the conversion of hydrocarbons in the presence of a hydrofluoric acid catalyst in which a liquid hydrocarbon conversion affluent is contacted with a contact material active in removing organically combined fluorine and containing minor proportions of silica and thereby is contaminated with silicon tetrafluoride and with water in a concentration such that it is soluble in said conversion effluent, and in which components of a resulting hydrocarbon effluent are separated by at least one fractional distillation under conditions such that water is concentrated in at least one of the overhead effluents of the distillations and said silicon tetrafluoride is hydrolyzed to form siliceous deposits during condensation of said overhead effluents containing said concentrated water, the method for preventing the formation of such siliceous deposits which comprises decreasing the water content of at least a portion of said overhead effluents from which such deposits separate below the amount of water which is soluble in said condensed effluents by contacting said overhead effluents showing deposition with a drying agent.

PAUL M. WADDILL.

REFERENCES CITED

The following references are of record in the file of this patent:

UNITED STATES PATENTS

| Number | Name | Date |
|---|---|---|
| 2,377,546 | Frey | June 5, 1945 |
| 2,412,220 | Ibach et al. | Dec. 10, 1946 |
| 2,413,868 | Frey | Jan. 7, 1947 |

OTHER REFERENCES

Perry, "Chemical Engineers' Handbook," 2d ed. (1941) McGraw-Hill (page 1523).